(12) United States Patent
Jung et al.

(10) Patent No.: US 8,443,197 B2
(45) Date of Patent: May 14, 2013

(54) VOICE-CAPABLE SYSTEM AND METHOD FOR AUTHENTICATION USING PRIOR ENTITY USER INTERACTION

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1222 days.

(21) Appl. No.: 11/241,742

(22) Filed: Sep. 30, 2005

(65) Prior Publication Data
US 2007/0195726 A1    Aug. 23, 2007

(51) Int. Cl.
*H04L 9/00* (2006.01)
(52) U.S. Cl.
USPC .......................................... 713/182; 713/180

(58) Field of Classification Search ............. 380/200, 380/30; 713/192, 168, 182; 726/4, 13, 30, 726/24; 719/311; 709/12, 14; 717/124
See application file for complete search history.

(56) References Cited

U.S. PATENT DOCUMENTS

| | | | |
|---|---|---|---|
| 6,757,365 B1 * | 6/2004 | Bogard | 379/88.17 |
| 2002/0035508 A1 * | 3/2002 | Amano et al. | 705/14 |
| 2003/0065805 A1 * | 4/2003 | Barnes, Jr. | 709/231 |
| 2003/0159034 A1 * | 8/2003 | Sato | 713/168 |
| 2004/0268142 A1 * | 12/2004 | Karjala et al. | 713/200 |
| 2005/0039056 A1 * | 2/2005 | Bagga et al. | 713/202 |
| 2006/0020460 A1 * | 1/2006 | Itou | 704/246 |
| 2006/0034287 A1 * | 2/2006 | Novack et al. | 370/395.2 |
| 2006/0204047 A1 * | 9/2006 | Dave et al. | 382/115 |
| 2007/0055517 A1 * | 3/2007 | Spector | 704/246 |

\* cited by examiner

*Primary Examiner* — Brandon Hoffman
*Assistant Examiner* — Nega Woldemariam (57) ABSTRACT

A system and method for use with a voice-capable system, includes but is not limited to a method including accessing by the voice-capable system of one or more entities computationally networked to the voice-capable system, obtaining one or more user interactions with the one or more entities and generating an authentication session using the one or more user interactions with the one or more entities.

43 Claims, 6 Drawing Sheets

Generating an authentication session using the one or more user interactions with the one or more entities 430

- Generating questions based on one or more of past purchases by the user 4302
- Generating questions based on one or more habits of the user 4304
- Generating questions based on one or more past user transactions over an internet connection 4306
  - Generating questions based on the one or more past transactions with a financial internet site 43062
  - Generating questions based on the one or more past user transactions with a search engine type internet site 43064
- Generating one or more multiple choice type questions from which the user can determine an answer from a set of two or more possible answers 4308
- Generating one or more single-answer questions for which answers having defined levels of precision are acceptable 4310
- Generating one or more questions based on the one or more user interactions with the one or more entities over a number of days, weeks, or months 4312

US 8,443,197 B2

VOICE-CAPABLE SYSTEM AND METHOD FOR AUTHENTICATION USING PRIOR ENTITY USER INTERACTION

TECHNICAL FIELD

The present application relates generally to security systems.

SUMMARY

In one aspect, a method for use with a voice-capable system includes but is not limited to accessing by the voice-capable system of one or more entities computationally networked to the voice-capable system; obtaining one or more user interactions with the one or more entities; and generating an authentication session using the one or more user interactions with the one or more entities. In addition to the foregoing, other method aspects are described in the claims, drawings, and text forming a part of the present application.

In another aspect, a computer program product includes but is not limited to a signal bearing medium bearing at least one of one or more instructions for accessing by the voice-capable system of one or more entities computationally networked to the voice-capable system; one or more instructions for obtaining one or more user interactions with the one or more entities; and one or more instructions for generating an authentication session using the one or more user interactions with the one or more entities. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

In one aspect, a voice-capable system includes but is not limited to a processor, an audio input and/or output circuitry coupled to the processor, a memory coupled to the processor, and a security module coupled to the processor, the security module configured to implement a secure protocol, the secure protocol configured to implement an automated system with one or more questions related to security/authentication, the security module configured to include an access module for accessing by the voice-capable system of one or more entities computationally networked to the voice-capable system, a logging module for obtaining one or more user interactions with the one or more entities, and an authentication generation module for generating an authentication session using the one or more user interactions with the one or more entities. In addition to the foregoing, other communication device aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

According to William Crossman, Founder/Director of CompSpeak 2050 Institute for the Study of Talking Computers and Oral Cultures, VIVOs, (e.g., voice-in/voice-out computers that may operate using visual displays) may make written language obsolete. VIVOs potentially can perform the functions of written language without requiring people to learn to read and write and, therefore, enable illiterate people, using VIVOs, to access the stored information.

Opening the doors for potentially billions of people to electronically-stored data presents a host of issues related to security and/or authentication. More particularly, according to Crossman, billions of illiterate people will be able to access data previously available only to the computer literate. The increase in the number of people with access to the Internet will increase the need for security systems that address the enhanced security risk. Moreover, VIVO technology will increase the number of security systems reliant on voice commands and subject users to security risks present with voice related systems.

To combat the security risk inherent in a VIVO system, embodiments herein present authentication and/or security solutions practical for voice-related security.

Figure 1:
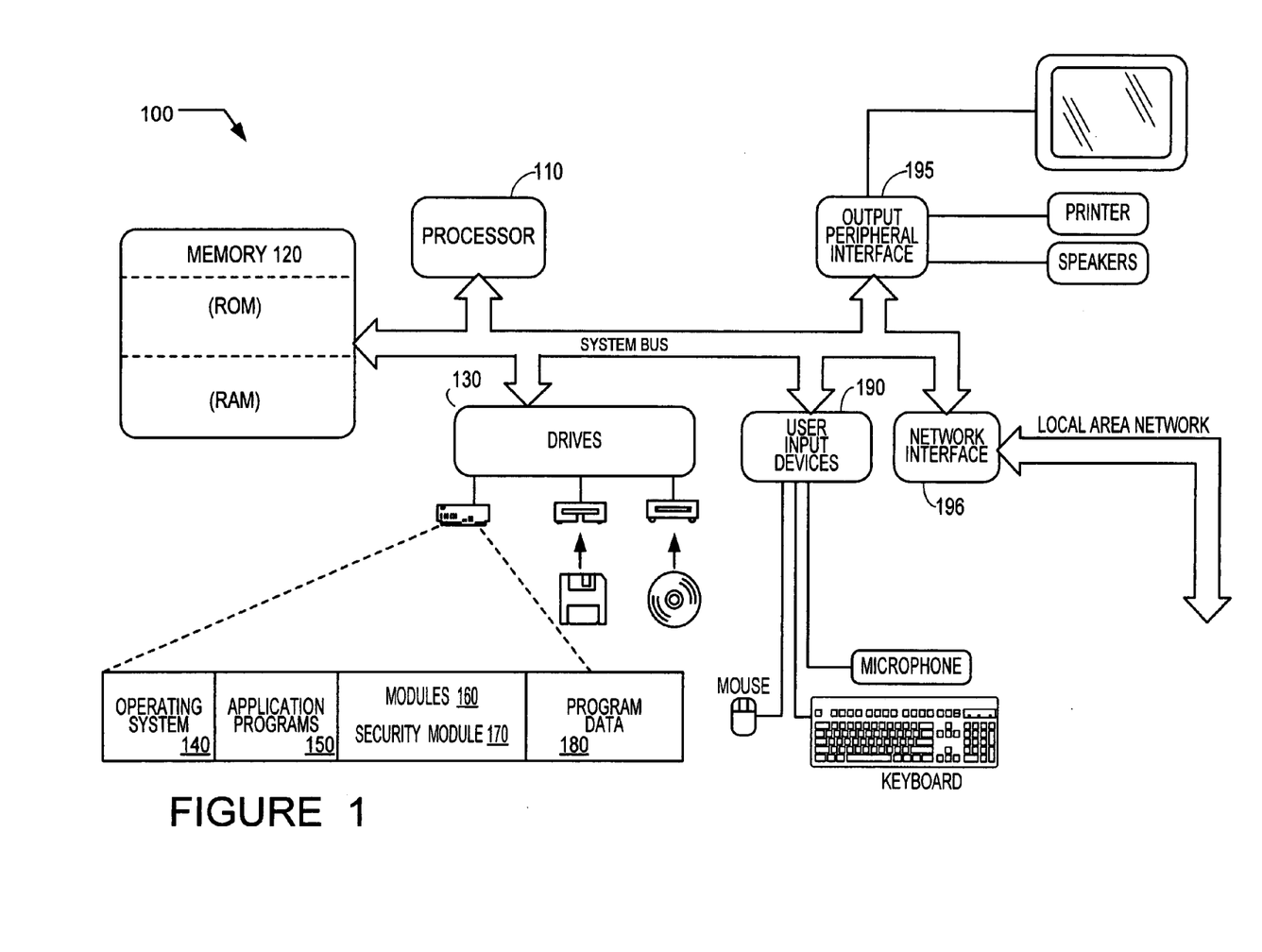
FIG. 1 is a block diagram of an exemplary computer architecture that supports the claimed subject matter of the present application.

With reference to FIG. 1, depicted is an exemplary computing system for implementing embodiments. FIG. 1 includes a computer 100, which could be a VIVO-capable computer, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, such as security module 170 and program data 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. In one or more embodiments, user input devices 190 are VIVO enabling devices, enabling a user to provide voice activated responses and/or questions.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 195 or the like. More particularly, output devices can include VIVO enabling devices capable of providing voice output in response to voice input.

Computer 100 may operate in a networked environment using logical connections to one or more remote computers, such as a remote computer. The remote computer may be a personal computer, a server, a router, a network PC, a peer device or other common network node, and can include many or all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or adapter. When used in a WAN networking environment, computer 100 typically includes a modem or other means for establishing communications over the WAN, such as the Internet. It will be appreciated that other means of establishing a communications link between the computers may be used.

According to one embodiment, computer 100 is connected in a networking environment such that the processor 110 and/or security module 170 determine whether incoming data follows a secure protocol. The incoming data can be from a VIVO communication device or from another data source. The secure protocol can be code stored in memory 120. For example, processor 110 can determine whether an incoming call is from a VIVO, determine that a secure protocol is necessary and apply an appropriate authentication.

Figure 2:
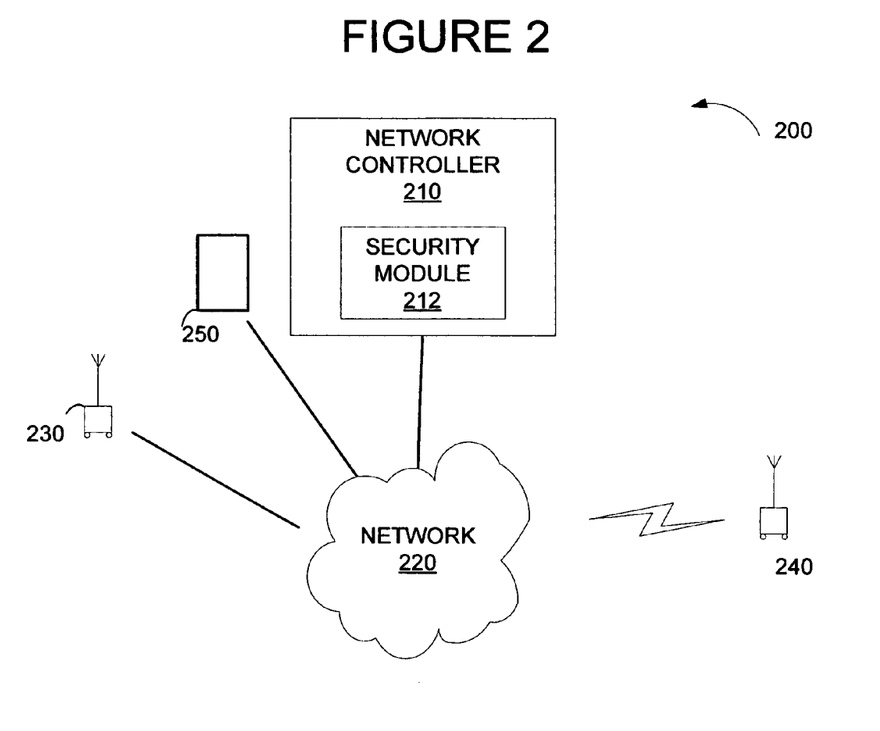
FIG. 2 is a block diagram of a network environment that supports the claimed subject matter of the present application.

Referring now to FIG. 2, illustrated is an exemplary block diagram of a system 200 capable of being operable with VIVO computer systems and interacting with a VIVO-type computer system. System 200 is shown including network controller 210, a network 220, and one or more communication devices 230, 240, and 250. Communication devices 230, 240, and 250 may include telephones, wireless telephones, cellular telephones, personal digital assistants, computer terminals or any other devices that are capable of sending and receiving data.

Network controller 210 is connected to network 220. Network controller 210 may be located at a base station, a service center, or any other location on network 220. Network 220 may include any type of network that is capable of sending and receiving communication signals, including VIVO-type signals. For example, network 220 may include a data network, such as the Internet, an intranet, a local area network (LAN), a wide area network (WAN), a cable network, and other like communication systems. Network 220 may also include a telecommunications network, such as a local telephone network, long distance telephone network, cellular telephone network, satellite communications network, cable television network and other like communications systems that interact with computer systems. Network 220 may include more than one network and may include a plurality of different types of networks. Thus, network 220 may include a plurality of data networks, a plurality of telecommunications networks, and a combination of data and telecommunications networks and other like communication systems.

In operation, one of the communication devices 230, 240, or 250, may attempt a communication with a receiving communication device. The communication can be routed through network 220 and network controller 210 to the receiving communication device. For example, a call originator communication device 230 may attempt a call to a call recipient communication device 240. In an embodiment, controller 210 is a VIVO-enabled controller such that an audible format may be a speech format. According to an embodiment, controller 210 can include a security module 212 that can poll the caller and a call recipient communication device 240 during call setup to pose authentication questions to secure a connection. For example, a call could be to a bank or other recipient with sensitive data requiring security.

Controller 210 can alter the format of the call by performing speech-to-text conversion on the call when controller 210 determines the format of the call requires a format change. Controller 210 can additionally alter the format of the call by performing text-to-speech conversion on the call when controller 210 determines the format of the call requires a format change. Controller 210 can then send the call in an appropriate format to the call recipient 240. In one embodiment, controller 210 is a VIVO-enabled controller that alters speech to text or speech to computer code in accordance with the requirements of a VIVO.

Figure 3:
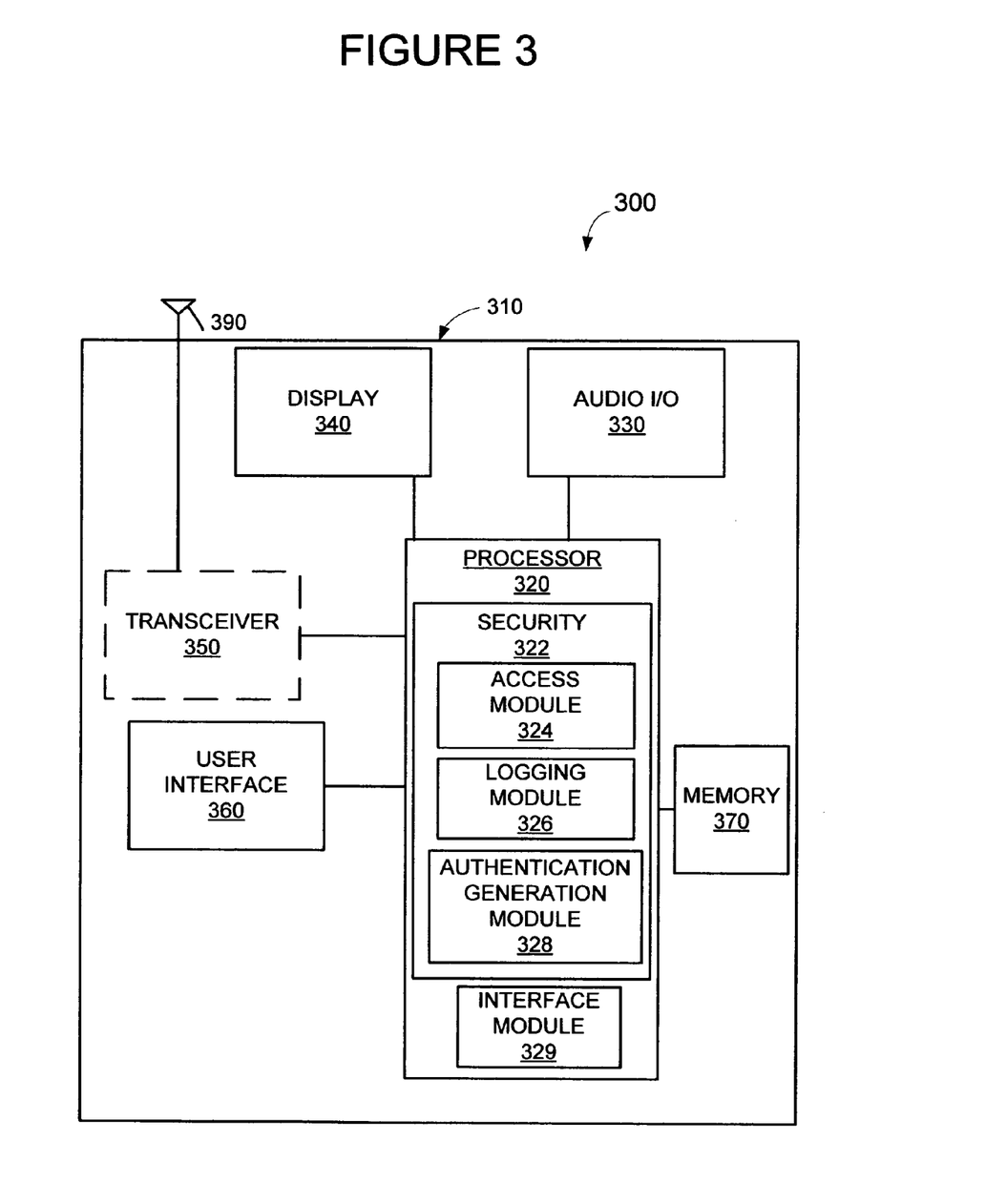
FIG. 3 is a block diagram of a communication device appropriate for embodiments of the subject matter of the present application.

FIG. 3 is an exemplary block diagram of a communication device 300, such as communication device 230 or 240 according to an embodiment, (e.g. FIG. 2). Communication device 300 can include a housing 310, a processor 320, audio input and output circuitry 330 coupled to processor 320, a display 340 coupled to processor 320, a user interface 360 coupled to processor 320 and a memory 370 coupled to processor 320. According to an embodiment, processor 320 includes security module 322. Security module 322 may be hardware coupled to the processor 320. Alternatively, security module 322 could be located within processor 320, or located in software located in memory 370 and executed by processor 320, or any other type of module. Memory 370 can include a random access memory, a read only memory, an optical memory, a subscriber identity module memory, or any other memory that can be coupled to a communication device. Display 340 can be a liquid crystal display (LCD), a light emitting diode (LED) display, a plasma display, or any other means for displaying information. Audio input and output circuitry 330 can include a microphone, a speaker, a transducer, or any other audio input and output circuitry. User interface 360 can include a keypad, buttons, a touch pad, a joystick, an additional display, or any other device useful for providing an interface between a user and an electronic device.

Processor 320 can be configured to control the functions of communication device 300. Communication device 300 can send and receive signals across network 220 using a transceiver 350 coupled to antenna 390. Alternatively, communication device 300 can be a device relying on twisted pair technology and not utilize transceiver 350.

According to an embodiment, a user can use either the user interface 360 for input and output of information to and from communication device 300 or use input and output using the audio input and output circuitry 330. Data received by communication device 300 can be displayed on display 340 and/or provided audibly through audio input and output circuitry 330. Communication device 300 can operate as a VIVO when operated in a fully audible format. For example, VIVO applications can be stored on memory 370 and processed by processor 320.

According to one embodiment, the processor 320 and/or security module 322 can determine whether an incoming call follows a secure protocol. The secure protocol can be code stored in memory 370. For example, processor 320 can determine an incoming call is from a VIVO, determine that a secure protocol is necessary and apply an appropriate authentication. Conversely, processor 320 and/or security module 322 can determine that an outgoing call should follow a secure protocol and implement the secure protocol.

According to an embodiment, security module is configured with modules for implementing embodiments disclosed herein. More particularly, security module 322 can be configured with access module 324 which can be configured for accessing by the voice-capable system of one or more entities computationally networked to the voice-capable system. The entities computationally networked to the voice-capable system can be entities with different security requirements and required authentications. For example, an entity computationally networked to the voice-capable system can be within a same computational network, such as a local area network (LAN), or the like. Conversely, an entity computationally-networked can be networked through an internet connection but require firewall access or other security measures to connect.

Security module 322 can further include logging module 326 for obtaining one or more user interactions with the one or more entities. The logging module can enable the logging within the communication device 300 or enable logging via communicating with an entity networked to the voice-capable system. Security module 322 is shown further including authentication generation module 328 configured to generate an authentication session using the one or more user interactions with the one or more entities. The authentication session can include the entities computationally networked to the voice-capable system, including those entities requiring authentication.

Processor 320 includes both security module 322 and interface module 329. According to an embodiment, interface module 329 is configured to enable modules 324, 326 and 328 to interface with computationally networked entities. Thus, for example, logging module can operate via interface module 329 to collect user interactions.

In one embodiment, either or both computer 100 and communication device 300 operate as VIVOs that are capable of implementing a secure protocol for incoming and/or outgoing audible data and/or speech. The secure protocol, in one embodiment, implements a user-centric question and answer to authenticate one or both of incoming and outgoing data when an auditory format is detected. For example, if computer 100 or communication device 300 is used to communicate with a bank, the bank could implement a secure protocol by operating a computer 100 with a security module or a communication device 300 with a security module. Likewise, the bank could operate via a secure network such as a network described in FIG. 2, and implement a secure protocol via network controller 210 implementing a security protocol via a security module.

In one embodiment, the security module is configured with processor (e.g., in either computer 100, communication device 300, or in a network controller 210) implementing a secure protocol, the secure protocol configured to implement authentication. More particularly, the security module could include a question module configured to serve as an automated system with one or more questions related to security/authentication, the security module configured to include an access module for accessing by the voice-capable system of one or more entities computationally networked to the voice-capable system, a logging module for obtaining one or more user interactions with the one or more entities, and an authentication generation module for generating an authentication session using the one or more user interactions with the one or more entities.

Figure 4A:
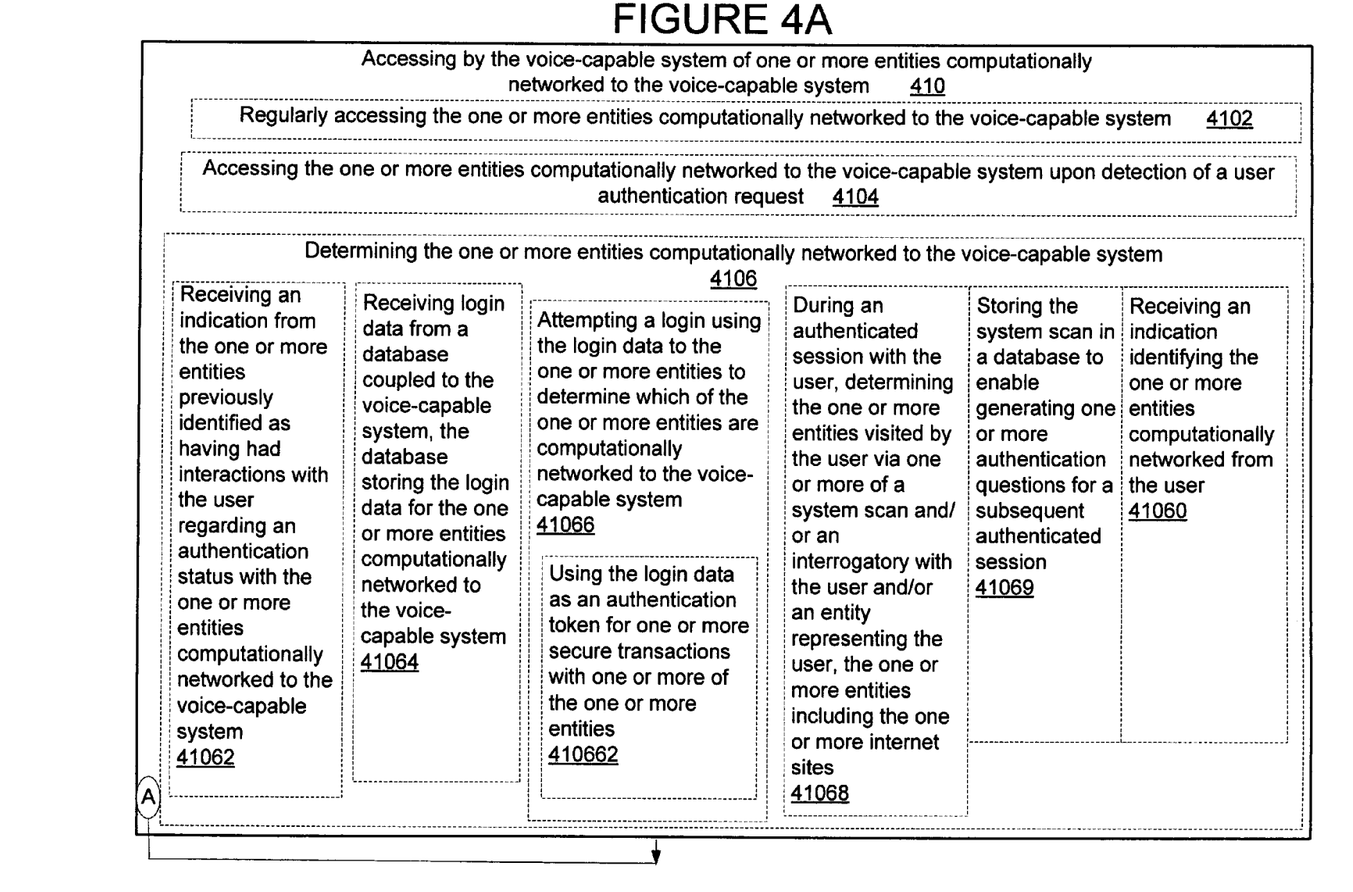
FIGS. 4A, 4B and 4C illustrate a flow diagram of a method in accordance with an embodiment of the subject matter of the present application.
Figure 4B:
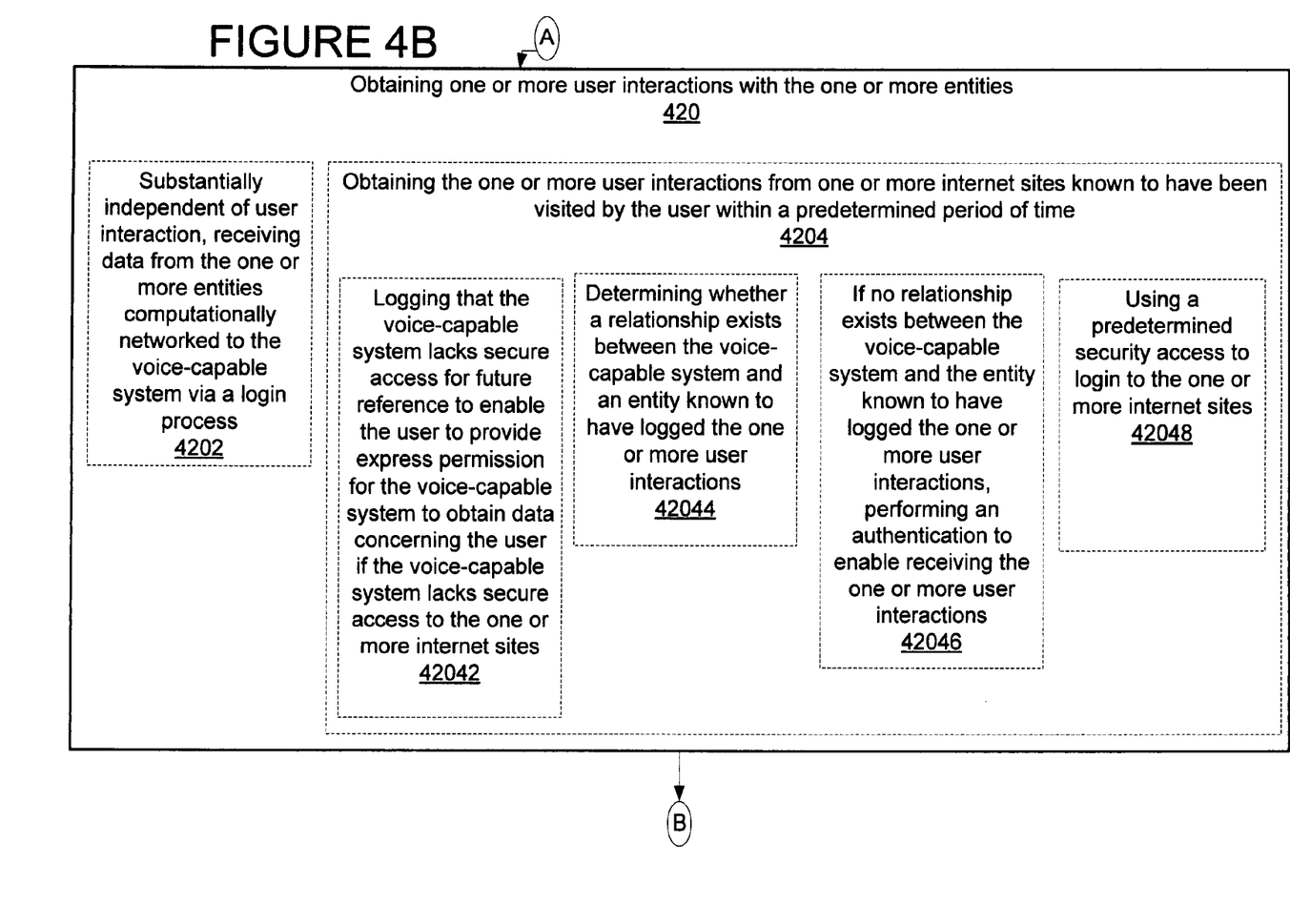
Figure 4C:
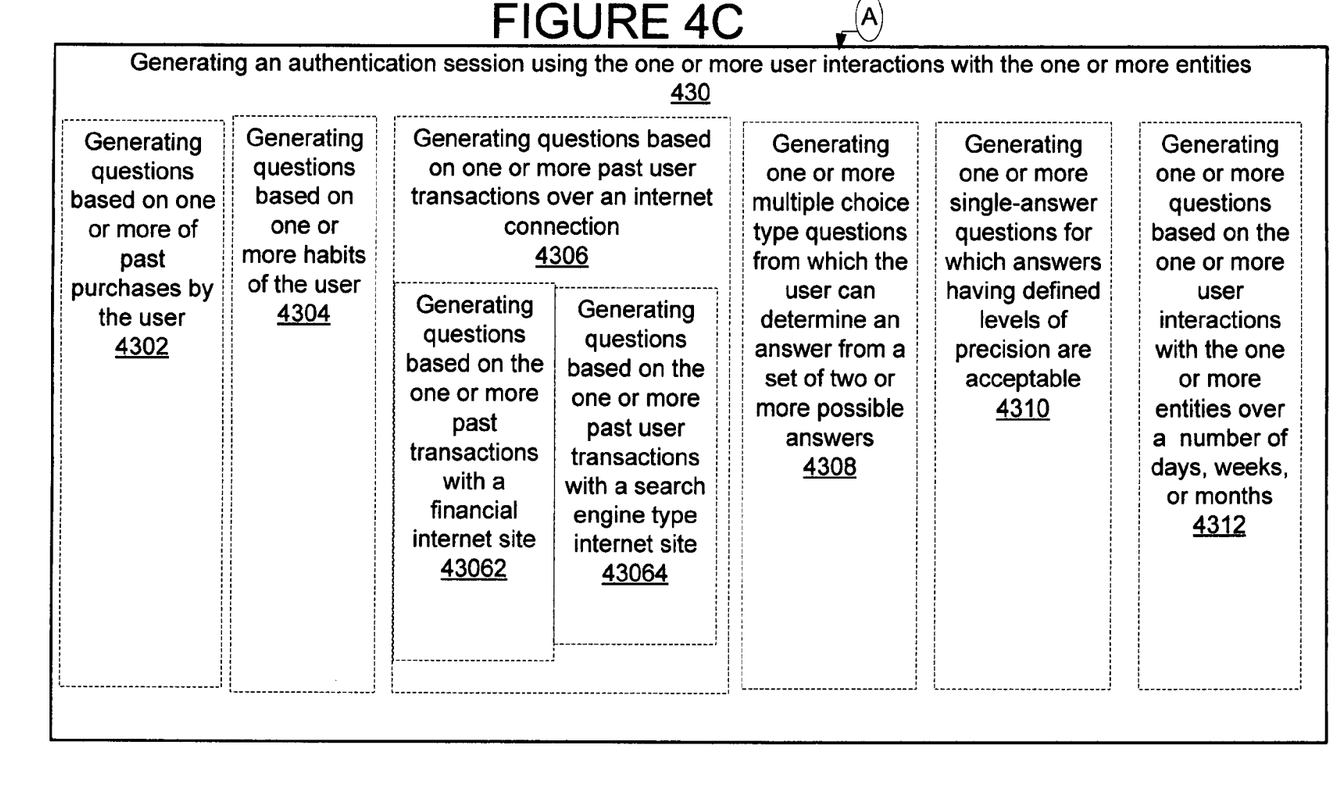

Referring now to FIGS. 4A, 4B and 4C, an exemplary flow diagram illustrates the operation of the processor 320 and/or security module 322 and/or network controller 210 according to an embodiment. One of skill in the art with the benefit of the present disclosure will appreciate that act(s) can be taken by security module 322, network controller 210, processor 110, and/or security module 170. The acts are generally referred to as being taken by a security processor.

FIGS. 4A, 4B and 4C provide methods for use with a voice-capable system, such as a system capable authentication. The authentication could be via a telephone to a security processor from a VIVO or the like. For example, a bank can receive a request to authenticate a customer, or the like. A security processor can determine that an authentication session is required. For example, the determination can be a determination by a bank that a user wishes to log into the bank. The determination can include a determination that a user is using a telephone to log into the bank via audible-only methods of communication. For example, a bank can operate via a network capable of accepting auditory communications from a user and have a computer, such as computer 100, or network controller 210, respond with auditory communications back to the user.

Block 410 provides for accessing by the voice-capable system of one or more entities computationally networked to the voice-capable system.

Depicted within block 410 is optional block 4102, which provides for regularly accessing the one or more entities computationally networked to the voice-capable system. Also depicted within block 410 is optional block 4104, which provides for accessing the one or more entities computationally networked to the voice-capable system upon detection of a user authentication request.

More particularly, the voice-capable system can determine entities that are networked internally, externally or the like to be able to perform periodic determinations of a user's interactions with the entities.

Block 410 further includes optional block 4106, which provides for determining the one or more entities computationally networked to the voice-capable system. Depicted within block 4106 is an optional block 41062, which provides for receiving an indication from the one or more entities previously identified as having had interactions with the user regarding an authentication status with the one or more entities computationally networked to the voice-capable system. For example, the determining which entities that are computationally networked can include having the security module attempt to connect to entities that a user provides to the voice-capable system. The user could provide the names of the entities during the authentication process or at another time.

Also depicted within block 4106 are optional blocks 41064 and 41066. Block 41064 provides for receiving login data from a database coupled to the voice-capable system, the database storing the login data for the one or more entities computationally networked to the voice-capable system. For example, a database could be coupled to the voice-capable system as part of an internal network or over the internet such that login data can be readily available to the voice-capable system. Block 41066 provides for attempting a login using the login data to the one or more entities to determine which of the one or more entities are computationally networked to the voice-capable system. For example, if the login data from the database is valid, the attempting a login should be successful.

Depicted within optional block 41066 is optional block 410662 which provides that the attempting a login using the login data to the one or more entities to determine which of the one or more entities are computationally networked to the voice-capable system can include using the login data as an authentication token for one or more secure transactions with one or more of the one or more entities. An authentication token can be a more secure form of login data as will be appreciated by one of skill in the art.

Optional block 4106 depicts another optional block 41068 which provides that the determining the one or more entities computationally networked to the voice-capable system can include during an authenticated session with the user, determining the one or more entities visited by the user via one or more of a system scan and/or an interrogatory with the user and/or an entity representing the user, the one or more entities including the one or more internet sites. Optional block 41069 provides for storing the system scan in a database to enable generating one or more authentication questions for a subsequent authenticated session. For example, a database of login data can include an optional scan result storage for consultation during authentication sessions with the user, other entities or the like.

Optional block 41060 provides that the determining the one or more entities computationally networked to the voice-capable system can include receiving an indication identifing the one or more entities computationally networked from the user.

Block 420 provides for one or more instructions for obtaining one or more user interactions with the one or more entities. The obtaining can include storing interactions that could be used in an authentication into a database for consultation or the like.

Depicted within block 420 is optional block 4202, which provides for substantially independent of user interaction, receiving data from the one or more entities computationally networked to the voice-capable system via a login process. In one embodiment, the system including the security module can automatically log into entities, such as different web sites or the like that are networked to the voice-capable system. In this context, a networked entity can be any entity accessible to the voice-capable system via a computer connection such as the internet, a direct connection, such as an internal network for a bank, or the like.

Block 420 further includes optional block 4204, which provides for obtaining the one or more user interactions from one or more internet sites known to have been visited by the user within a predetermined period of time. In an embodiment, the predetermined period of time can be a last visit, a period of hours, weeks, or the like, dependent on user or security module parameters. For example, the period of time can be a function of the security level.

Depicted within optional block 4204 are optional blocks 42042, 42044, 42046, and 42048.

Block 42042 provides for logging that the voice-capable system lacks secure access for future reference to enable the user to provide express permission for the voice-capable system to obtain data concerning the user if the voice-capable system lacks secure access to the one or more internet sites. For example, if an attempt is made by the voice-capable system to acquire secure access and the access failed, the voice-capable system can log or otherwise denote that secure access was not possible or the like and in the future contact or otherwise note that the user should be notified of the failure to gain access. The user can then provide express permission for the voice capable system to obtain data concerning the user, if the user choses to allow such access. Alternatively, the user can chose to prevent the voice-capable system from gaining secure access and the voice-capable system can log that express permission will not be forthcoming.

Optional block 42044 provides for determining whether a relationship exists between the voice-capable system and an entity known to have logged the one or more user interactions; and block 42046 provides that if no relationship exists between the voice-capable system and the entity known to have logged the one or more user interactions, performing an authentication to enable receiving the one or more user interactions. Thus, if an interaction of the user with a known internet site is available but the voice-capable system is unable to determine the interactions with the user due to having incorrect, out-of-date login information or does not have login information, the voice-capable system can log that such information is lacking to give a user an opportunity in the future to provide the login information. Thus, to enhance the security of the system, after a user has a successful authentication, the user can provide login information for additional internet sites with secure login information unknown to the voice-capable system.

Optional block 42048 provides for using a predetermined security access to login to the one or more internet sites. The predetermined security access can be prearranged through the user or can be an internal protocol used to provide security access to internet sites. The internal protocol can be a protocol pursuant to an agreement the voice-capable system has with other internet sites that authenticates the voice-capable system as a trusted party independent of the user. For example, a voice-capable system could be a subsidiary or partner of another entity operating an internet site, in which case the secure access could be had internally without the need to have the user provide login information.

Block 430 provides for generating an authentication session using the one or more user interactions with the one or more entities. In an embodiment, an associated-correct answer could be collected to be used in future authentication sessions with the user to provide an additional layer of security.

Depicted within block 430 is block 4302, which provides for generating questions based on one or more of past purchases by the user. For example, a web site could be accessible to a security module to enable the voice-capable system to determine a number of purchases made by the user over the internet. The purchases could be from a direct sale entity, from a bank of the user or any internet entity that can provide accurate information on past purchases. Block 430 further illustrates block 4304, which provides that the voice-capable system can generate an authentication session by generating questions based on one or more habits of the user. For example, a secure module could receive information that provides habits of a user by establishing that a user performs a certain act or acts with an entity at a certain time or with an established periodicity or the like.

Also depicted within block 430 is optional block 4306, which provides for generating questions based on one or more past user transactions over an internet connection. A transaction could be a number of different activities a user has performed on an internet site including browsing transactions, click sequences that occurred and the like.

Also depicted within optional block 4306 is an optional block 43062, which provides that the generating questions based on one or more past user transactions over an internet connection can include generating questions based on the one or more past transactions with a financial internet site. For example, the internet site transactions could be financial transactions at a bank or the like. Also depicted within optional block 4306 is an optional block 43064, which provides for generating questions based on the one or more past user transactions with a search engine type internet site. For example, an internet site visited by the user could be Yahoo or Google or the like and the questions can include a last search performed by the user.

Also depicted within block 430 is an optional block 4308, which provides that the generating an authentication session using the one or more user interactions with the one or more entities can include generating one or more multiple choice type questions from which the user can determine an answer from a set of two or more possible answers. Thus, a user can determine an answer from a provided set of answers.

Block 430 also includes an optional block 4310 which provides that the generating an authentication session using the one or more user interactions with the one or more entities can include generating one or more single-answer questions for which answers having defined levels of precision are acceptable. A more secure authentication may require exact answers to a simple question or a complicated question.

Also depicted within block 430 is an optional block 4312 which provides that the generating an authentication session using the one or more user interactions with the one or more entities can include generating one or more questions based on the one or more user interactions with the one or more entities over a number of days, weeks, or months.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.;

and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

We claim:

1. A method for use with a voice-capable system, the method comprising:
   accessing by the voice-capable system of one or more entities computationally networked to the voice-capable system, wherein each of the one or more entities are an institution or business with an internet presence, wherein the internet presence has had a prior interaction with a user, each of the one or more entities requiring the user to provide authentication to access the internet presence, and the voice-capable system accessing one or more user interactions with the one or more entities from one or more internet sites;
   obtaining evidence of one or more user interactions with the one or more entities from one or more internet sites known to have been visited by the user within a predetermined period of time, the predetermined period of time being a function of a security level; and
   generating an authentication session using data from the one or more entities, wherein the authentication session includes verifying the user access to the voice-capable system using the data from the authentication to access the internet presence.

2. The method of claim 1 wherein the accessing by the voice-capable system of one or more entities computationally networked to the voice-capable system includes: regularly accessing the one or more entities computationally networked to the voice-capable system.

3. The method of claim 1 wherein the accessing by the voice-capable system of one or more entities computationally networked to the voice-capable system includes: accessing the one or more entities computationally networked to the voice-capable system upon detection of a user authentication request.

4. The method of claim 1 wherein the accessing by the voice-capable system of one or more entities computationally networked to the voice-capable system includes: determining the one or more entities computationally networked to the voice-capable system.

5. The method of claim 4 wherein the determining the one or more entities computationally networked to the voice-capable system includes: receiving an indication from the one or more entities previously identified as having had interactions with the user regarding an authentication status with the one or more entities computationally networked to the voice-capable system.

6. The method of claim 4 wherein the determining the one or more entities computationally networked to the voice-capable system includes: receiving login data from a database coupled to the voice-capable system, the database storing the login data for the one or more entities computationally networked to the voice-capable system; and attempting a login using the login data to the one or more entities to determine which of the one or more entities are computationally networked to the voice-capable system.

7. The method of claim 6 wherein the attempting a login using the login data to the one or more entities to determine which of the one or more entities are computationally networked to the voice-capable system includes: using the login data as an authentication token for one or more secure transactions with one or more of the one or more entities.

8. The method of claim 4 wherein the determining the one or more entities computationally networked to the voice-capable system includes: during an authenticated session with the user, determining the one or more entities visited by the user via at least one of a system scan, an interrogatory with the user and an entity representing the user, the one or more entities including the one or more internet sites; and storing the system scan in a database to enable generating one or more authentication questions for a subsequent authenticated session.

9. The method of claim 4 wherein the determining the one or more entities computationally networked to the voice-capable system includes: receiving an indication identifying the one or more entities computationally networked from the user.

10. The method of claim 1 wherein the generating an authentication session using the data from the one or more entities includes: generating questions based on one or more of past purchases by the user.

11. The method of claim 1 wherein the generating an authentication session using the data from the one or more entities includes: generating questions based on one or more habits of the user.

12. The method of claim 1 wherein the generating an authentication session using the data from the one or more entities includes: generating questions based on one or more past user transactions over an internet connection.

13. The method of claim 12 wherein the generating questions based on one or more past user transactions over an internet connection includes: generating questions based on the one or more past transactions with a financial internet site.

14. The method of claim 12 wherein the generating questions based on one or more past user transactions over an internet connection includes: generating questions based on the one or more past user transactions with a search engine type internet site.

15. The method of claim 1 wherein the generating an authentication session using the data from the one or more entities includes: generating one or more multiple choice type questions from which the user can determine an answer from a set of two or more possible answers.

16. The method of claim 1 wherein the generating an authentication session using the data from the one or more entities includes: generating one or more single-answer questions for which answers having defined levels of precision are acceptable.

17. The method of claim 1 wherein the generating an authentication session using the data from the one or more entities includes: generating one or more questions based on the one or more user interactions with the one or more entities over a number of days, weeks, or months.

18. One or more non-transitory computer readable media comprising one or more computer-readable instructions for executing a process comprising:
   accessing by the voice-capable system of one or more entities computationally networked to the voice-capable system, wherein each of the one or more entities are an institution or business with an internet presence, wherein the internet presence has had a prior interaction with the user, each of the one or more entities requiring the user to provide authentication to access the internet presence, and
   obtaining one or more user interactions with the one or more entities from one or more internet sites known to have been visited by a user within a predetermined period of time, the predetermined period of time being a function of a security level; and
   generating an authentication session using data from the one or more entities, wherein the authentication session includes verifying the user access to the voice-capable system using the data from the authentication to access the internet presence.

19. The one or more non-transitory computer readable media of claim 18 wherein the signal bearing medium comprises: a transmission medium.

20. The one or more non-transitory computer readable media of claim 18 wherein the one or more instructions for accessing by the voice-capable system of one or more entities computationally networked to the voice-capable system includes: one or more instructions for regularly accessing the one or more entities computationally networked to the voice-capable system.

21. The one or more non-transitory computer readable media of claim 18 wherein the one or more instructions for accessing by the voice-capable system of one or more entities computationally networked to the voice-capable system includes: one or more instructions for accessing the one or more entities computationally networked to the voice-capable system upon detection of a user authentication request.

22. The one or more non-transitory computer readable media of claim 18 wherein the one or more instructions for accessing by the voice-capable system of one or more entities computationally networked to the voice-capable system includes: one or more instructions for determining the one or more entities computationally networked to the voice-capable system.

23. The one or more non-transitory computer readable media of claim 22 wherein the one or more instructions for determining the one or more entities computationally networked to the voice-capable system includes: one or more instructions for receiving an indication from the one or more entities previously identified as having had interactions with the user regarding an authentication status with the one or more entities computationally networked to the voice-capable system.

24. The one or more non-transitory computer readable media of claim 22 wherein the one or more instructions for determining the one or more entities computationally networked to the voice-capable system includes: one or more instructions for receiving login data from a database coupled to the voice-capable system, the database storing the login data for the one or more entities computationally networked to the voice-capable system; and one or more instructions for attempting a login using the login data to the one or more entities to determine which of the one or more entities are computationally networked to the voice-capable system.

25. The one or more non-transitory computer readable media of claim 24 wherein the one or more instructions for attempting a login using the login data to the one or more entities to determine which of the one or more entities are computationally networked to the voice-capable system includes: one or more instructions for using the login data as an authentication token for one or more secure transactions with one or more of the one or more entities.

26. The one or more non-transitory computer readable media of claim 22 wherein the one or more instructions for determining the one or more entities computationally networked to the voice-capable system includes: one or more instructions for during an authenticated session with the user, determining the one or more entities visited by the user via one or more of a system scan and/or an interrogatory with the user and/or an entity representing the user, the one or more entities including the one or more internet sites; and one or more instructions for storing the system scan in a database to enable generating one or more authentication questions for a subsequent authenticated session.

27. The one or more non-transitory computer readable media of claim 22 wherein the one or more instructions for determining the one or more entities computationally networked to the voice-capable system includes: one or more instructions for receiving an indication identifying the one or more entities computationally networked from the user.

28. The one or more non-transitory computer readable media of claim 18 wherein the one or more instructions for generating an authentication session using the data from the one or more entities includes: one or more instructions for generating questions based on one or more of past purchases by the user.

29. The one or more non-transitory computer readable media of claim 18 wherein the one or more instructions for generating an authentication session using the data from the one or more entities further comprises: one or more instructions for generating questions based on one or more habits of the user.

30. The one or more non-transitory computer readable media of claim 18 wherein the one or more instructions for generating an authentication session using the data from the one or more entities further comprises: one or more instructions for generating questions based on one or more past user transactions over an internet connection.

31. The one or more non-transitory computer readable media of claim 30 wherein the one or more instructions for said generating questions based on one or more past user transactions over an internet connection further comprises: one or more instructions for generating questions based on the one or more past transactions with a financial internet site.

32. The one or more non-transitory computer readable media of claim 30 wherein the one or more instructions for said generating questions based on one or more past user transactions over an internet connection further comprises: one or more instructions for generating questions based on the one or more past user transactions with a search engine type internet site.

33. The one or more non-transitory computer readable media of claim 18 wherein the generating an authentication session using the data from the one or more entities includes: one or more instructions for generating one or more multiple choice type questions from which the user can determine an answer from a set of two or more possible answers.

34. The one or more non-transitory computer readable media of claim 18 wherein the generating an authentication session using the data from the one or more entities includes: one or more instructions for generating one or more single-answer questions for which answers having defined levels of precision are acceptable.

35. The one or more non-transitory computer readable media of claim 18 wherein the generating an authentication session using the data from the one or more entities includes: one or more instructions for generating one or more questions based on the one or more user interactions with the one or more entities over a number of days, weeks, or months.

36. A voice-capable system comprising:
a processor;
audio input and/or output circuitry coupled to the processor;
a memory coupled to the processor; and
a security module coupled to the processor, the security module configured to implement a secure protocol, the secure protocol configured to implement an automated system with one or more questions related to security/authentication, the security module configured to include:
an access module for accessing by the voice-capable system of one or more entities computationally networked to the voice-capable system, wherein each of the one or more entities are an institution or business with an internet presence, wherein the internet presence has had a prior interaction with the user, each of the one or more entities requiring the user to provide authentication to access the internet presence;
a logging module for obtaining one or more user interactions with the one or more entities from one or more internet sites known to have been visited by a user within a predetermined period of time the predetermined period of time being a function of a security level; and
an authentication generation module for generating an authentication session using data from the one or more entities, wherein the authentication session includes verifying the user access to the voice-capable system using the data from the authentication to access the internet presence.

37. The voice-capable system of claim 36 wherein the security module is coupled to the processor, located within the processor, and/or located in the memory.

38. The voice-capable system of claim 36 wherein the memory is one or more of a random access memory, a read only memory, an optical memory, or a subscriber identity module memory.

39. The voice-capable system of claim 36 wherein the audio input and/or output circuitry includes one or more of a microphone, a speaker, a transducer, and/or audio input and/or output circuitry.

40. The voice-capable system of claim 36 further comprising a housing coupled to the processor, the housing encasing the memory, the processor, and/or the audio input and/or output circuitry.

41. The method of claim 1 wherein the internet presence prior interaction with the user is a history of one or more past purchases by the user stored in the internet presence.

42. The method of claim 1 wherein the internet presence prior interaction with the user is a history of one or more past purchases by the user stored in a different internet presence.

43. The method of claim 1 wherein the user access to the voice-capable system includes a secure user access to the voice-capable system resources.

* * * * *